(12) United States Patent
Love

(10) Patent No.: US 6,946,748 B2
(45) Date of Patent: Sep. 20, 2005

(54) INERTIA WHEEL COUPLED WITH A LEVERAGE TRANSMISSION

(76) Inventor: Kevin R. Love, 33262 Sea Knoll Dr., Dana Point, CA (US) 92629

(*) Notice: Subject to any disclaimer, the term of this patent is extended or adjusted under 35 U.S.C. 154(b) by 96 days.

(21) Appl. No.: 10/726,776

(22) Filed: Dec. 3, 2003

(65) Prior Publication Data
US 2005/0120815 A1 Jun. 9, 2005

(51) Int. Cl.$^7$ ................................................ H02K 7/02
(52) U.S. Cl. ........................... 290/1 C; 290/1 R; 74/64; 322/4
(58) Field of Search ................................ 290/1 R, 1 C, 290/45; 74/64, 640; 322/4

(56) References Cited

U.S. PATENT DOCUMENTS

| | | | | |
|---|---|---|---|---|
| 3,653,269 A | * | 4/1972 | Foster | 74/84 S |
| 3,955,429 A | * | 5/1976 | Holden | 74/64 |
| 4,141,256 A | * | 2/1979 | Wilson et al. | 74/64 |
| 4,154,121 A | * | 5/1979 | Yamasaki | 74/141 |
| 4,157,667 A | * | 6/1979 | Rinaldi | 74/365 |
| 4,307,629 A | * | 12/1981 | Moller | 475/255 |
| 4,573,651 A | * | 3/1986 | Stanton | 244/165 |
| 6,546,769 B2 | * | 4/2003 | Miller et al. | 70/303 A |
| 6,805,025 B2 | * | 10/2004 | Ruttor | 74/640 |

* cited by examiner

Primary Examiner—Nicholas Ponomarenko
(74) Attorney, Agent, or Firm—Stetina Brunda Garred & Brucker

(57) ABSTRACT

An apparatus is provided which includes an inertia wheel rigidly attached to a center axle, such that the wheel and axle adapted to unitarily rotate about a center axis. An axle support is adapted to rotatably support the center axle such that the inertia wheel and center axle may freely spin about the center axis. A generally planar leftside cam supporting structure is laterally positioned from the leftside of the inertia wheel such that the leftside cam supporting structure and the inertia wheel are evenly spaced from each other in a parallel manner. The leftside cam supporting structure includes a leftside inverse cam. Also, generally planar rightside cam supporting structure is laterally positioned from the rightside of the inertia wheel such that the rightside cam supporting structure and the inertia wheel are evenly spaced from each other in a parallel manner. The rightside cam supporting structure also includes a rightside inverse cam. A plurality of transfer follower arm assemblies are further provided interconnecting the leftside and rightside of the inertia wheel to the leftside and rightside cam supporting structure. Rotational movement of the inertia wheel is at least one of conditioned, controlled, regulated, governed and influenced as a function of a profile of the leftside and rightside cam.

19 Claims, 8 Drawing Sheets

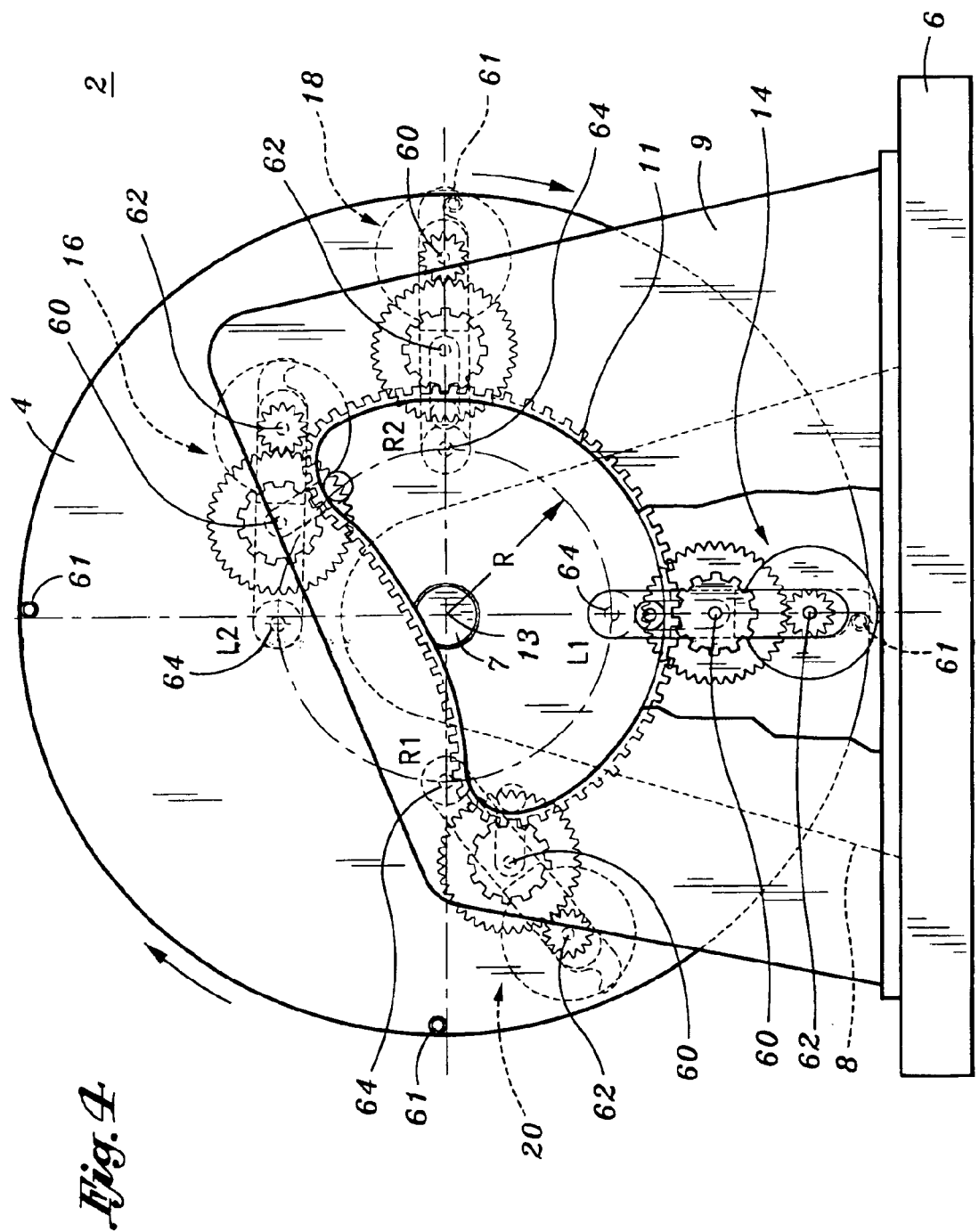

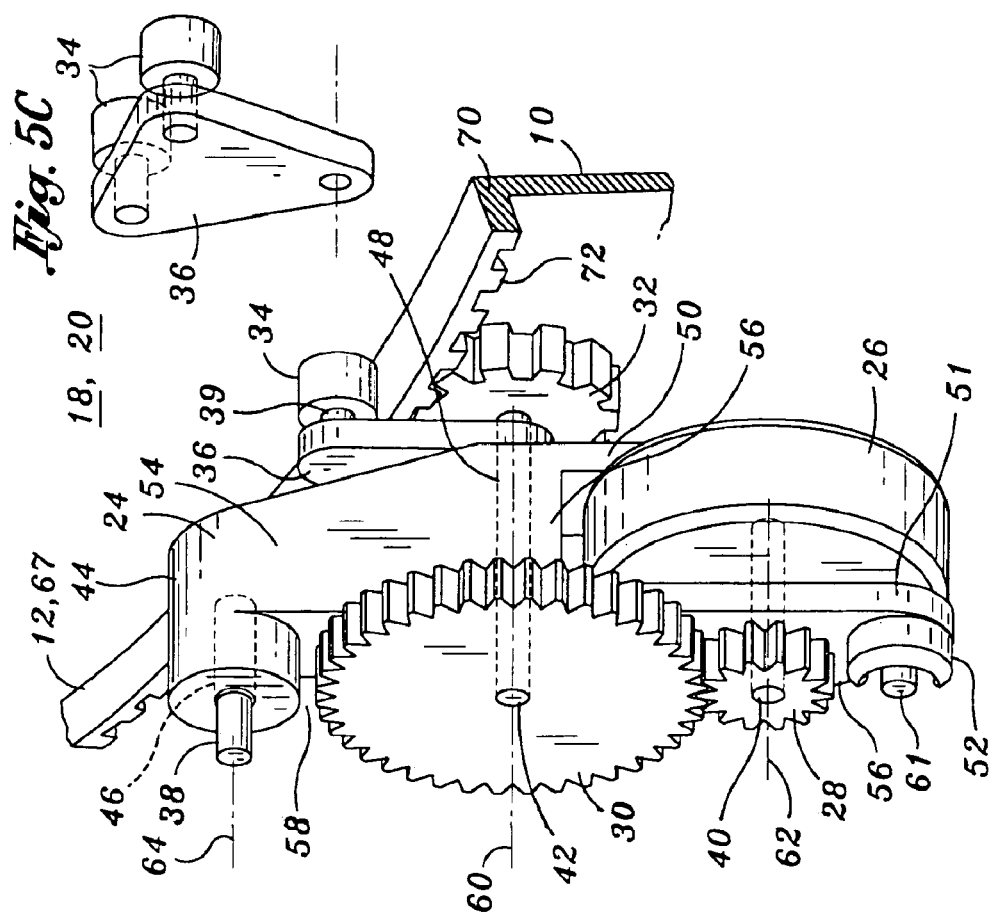
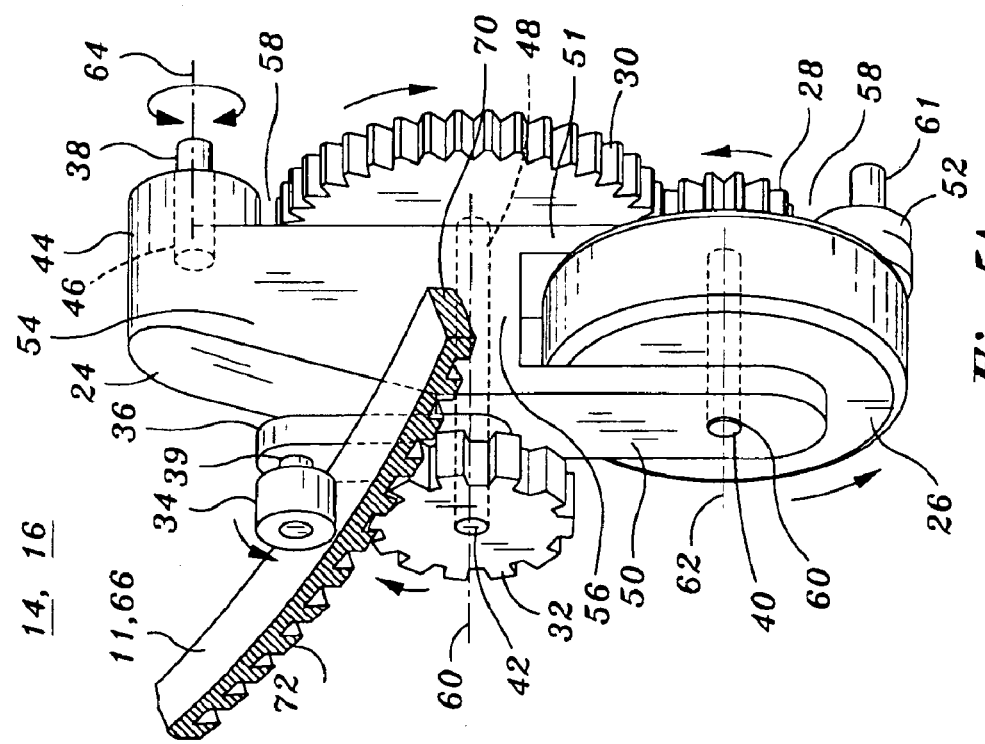

INERTIA WHEEL COUPLED WITH A LEVERAGE TRANSMISSION

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to an inertia wheel or flywheel apparatus. In particular, the present invention relates to an inertia wheel apparatus coupled to a leverage transmission.

2. Background of the Invention

Flywheels are one of the oldest and most common mechanical devices in existence. Flywheels store energy mechanically in the form of kinetic energy. In essence, a flywheel is a mechanical battery which may be considered simply a mass rotating about an axis.

Within the last few decades, as a result of fuel shortages and environmental pollution, suggestions have been made to utilize unconventional energy sources to overcome the ever growing concerns of the depletion of natural energy reserves. Flywheels have inherent appeal as an alternative to traditional energy-storage technologies. Part of this appeal is due to the sheer simplicity of storing kinetic energy in a spinning mass. The promise of a compact, safe, environmentally benign, low-maintenance, long-lasting and predictable source of energy has intrigued inventors and investors alike for applications such as electric vehicles, utility load-leveling and satellite control. Accordingly, there is much interest in the use of flywheels to store and transfer kinetic energy.

The inertia wheel or flywheel is an attractive energy-storage concept for several reasons: (1) it is simple; (2) it is possible to store and abstract energy readily, either by mechanical means or by using electric motors and generators; (3) high power rates are practicable; (4) there is no stringent limitation on the number of charge and discharge cycles that can be used; (5) reliability promises to be high; and (6) maintenance costs are low.

At this time, however, modern flywheel technology is considered to be in its infancy. Any specific application will require consideration of technical alternatives and a cost analysis. The following criteria must be evaluated in each case: (2) how much energy can be stored per unit weight or volume of flywheel material, which in turn controls (2) the size flywheel required, (3) relative importance of friction losses and associated inefficiency, (4) system safety, and (5) nature of controls and systems needed to provide the proper interface between source of energy and the demand for it.

One area of particular interest is in the field of flywheel interface and control systems technologies for controlling the speed (RPM), acceleration and deceleration of an inertia wheel utilizing a leverage transmission. Currently, there are no flywheel interfaces which are capable of controlling or conditioning the kinetic motion of a flywheel by leverage. Therefore, it would be advantageous to provide a leverage transmission for an inertia wheel for the purpose of controlling the motion of the inertia wheel.

BRIEF SUMMARY OF THE INVENTION

According to the present invention, a mechanical device is provided which includes a basic inertia wheel coupled with a leverage transmission for regulating the motion of the inertia wheel.

According to an exemplary embodiment of the present invention, an apparatus is provided which includes an inertia wheel having a leftside and rightside. The wheel is rigidly attached to a center axle, such that the wheel and axle are adapted to unitarily rotate about a center axis. An axle support is provided which is adapted to rotatably support the center axle such that the inertia wheel and center axle may freely spin about the center axis. A generally planar leftside cam supporting structure is laterally positioned from the leftside of the inertia wheel such that the leftside cam supporting structure and the inertia wheel are evenly spaced from each other in a parallel manner. Moreover, the leftside cam supporting structure includes a leftside inverse cam. A generally planar rightside cam supporting structure is laterally positioned from the rightside of the inertia wheel such that the rightside cam supporting structure and the inertia wheel are evenly spaced from each other in a parallel manner. The rightside cam supporting structure also includes a rightside inverse cam. A plurality of transfer follower arm assemblies are further provided interconnecting the leftside and rightside of the inertia wheel to the leftside and rightside cam supporting structure. Rotational movement of the inertia wheel is at least one of conditioned, controlled, regulated, governed and influenced as a function of a profile of the leftside and rightside cam.

According to another aspect of the present invention, each one of the plurality of transfer follower arm assemblies includes a transfer arm structure. The transfer arm structure has a main body with a connecting wrist integrally formed on one end and a pair of forks integrally formed on an opposing end. The connecting wrist is rotatably attached to an attachment point on one of the leftside and rightside of the inertia wheel, the attachment point being defined by a radius R from the center axis. The main body has an axle receiving hole transversely oriented within the main body. The pair of forks includes an outboard fork laterally space apart from an inboard fork, the inboard fork further including a wheel catch integrally formed on a distal end of the inboard fork. A weighted orbital drive wheel is rigidly fit onto a first transmission axle, wherein the first transmission axle is transversely and rotatably mounted to the pair of forks such that the weighted orbital drive wheel may freely spin between the pair of forks. A first transmission gear is rigidly fit onto a portion of the first transmission axle extending from an exterior side of the inboard fork. A second transmission gear is rigidly fit onto an inner exterior portion of a second transmission axle rotatably secured within the axle receiving hole transversely oriented within the main body, such that the second transmission gear intermeshes with the first transmission gear. The second transmission gear has a greater diameter that the first transmission gear. A drive gear is rigidly fit onto an outer exterior portion of the second transmission axle. A cam track retaining system is further included which comprises a retaining member having one end rotatably attached to the second transmission axle and further positioned between the drive gear and the transfer arm structure, and at least one retaining wheel rotatably attached to another end of the retaining member.

According to another aspect of the present invention, the leftside and rightside inverse cam are integrally formed into the respective leftside and rightside cam supporting structure, wherein each supporting structure has a void defined by a crescent shaped perimeter, and wherein the plurality of transfer arm assemblies are adapted to be movably attached to the crescent shaped perimeter. According to still a further aspect of the present invention, the inverse cam further includes an inwardly protruding rail integrally formed along the crescent shaped perimeter, wherein the rail protrudes from an inboard side of the respective leftside and rightside cam supporting structure and is further oriented perpendicular to the respective leftside and rightside cam supporting structure.

Additionally, other aspects of the present invention include the inwardly protruding rail having an inner side adapted to interface at least one retaining wheel and an outer side having gear teeth disposed on the surface thereof, wherein the gear teeth are adapted to intermesh with a drive gear of one of the plurality of transfer arm assemblies. Moreover, according to another aspect of the present invention, each of the plurality of transfer follower arms includes a connecting wrist rotatably attached to a side of the inertia wheel and a cam track retaining system adapted to movably couple the transfer follower arm to the respective leftside or rightside inverse cam. Furthermore, each connecting wrist is attached to the side of the inertia wheel along a radial perimeter having a radius distance R from the center axis of the apparatus.

According to other aspects of the present invention, the plurality of transfer follower arm assemblies include a first and second leftside transfer follower arm assembly positioned between a leftside of the inertia wheel and the leftside cam supporting structure; and a first and second rightside transfer follower arm assembly positioned between a rightside of the inertia wheel and the rightside cam supporting structure. The connecting wrist of the first leftside transfer follower arm assembly is attached to a rotational attach point L1 positioned on the leftside of the inertia wheel about the radial perimeter defined by R. The connecting wrist of the second leftside transfer follower arm assembly is attached to a rotational attach point L2 positioned on the leftside of the inertia wheel about the radial perimeter defined by R, and positioned 180 degrees from said attach point L1. Further, the connecting wrist of the first rightside transfer follower arm assembly attached to a rotational attach point RI positioned on the rightside of the inertia wheel about the radial perimeter defined by R. And, the connecting wrist of the second rightside transfer follower arm assembly is attached to a rotational attach point R2 positioned on the rightside of the inertia wheel about the radial perimeter defined by R, and positioned 180 degrees from said attach point R1. Moreover, R1 is further positioned about the radial perimeter such that R1 is spaced ninety degrees from both L1 and L2, and positioned there between L1 and L2 along the radial perimeter; and R2 is further positioned about the radial perimeter such that R2 is spaced ninety degrees from both L1 and L2, and positioned there between L1 and L2 along the radial perimeter.

According to a further aspect of the present invention, the inertia wheel further includes a plurality of catching members positioned proximate a circular outer perimeter of the leftside and rightside of the inertia wheel wherein, the plurality of catching members protrude from the leftside and rightside of the inertia wheel in a perpendicular orientation. Furthermore, according to another aspect of the present invention, the wheel catch of the transfer arm structure is adapted to engage one of the plurality of catching members. Also, when the inertia wheel rotates about the center axis, the cam track retaining system on each of the plurality of transfer follower arm assemblies travels around the perimeter of said inverse cam.

Other aspects of the present invention include initiating an individual arm cycle when the wheel catch of the transfer arm engages one of the plurality of catching members. Furthermore, according to another aspect of the present invention, the transfer follower arm circumvents the perimeter of the inverse cam in one cycle. Moreover, an individual arm cycle correlates to one revolution of the inertia wheel. According to other aspects of the present invention, the motion of each of the transfer follower arms is measured according to a 360 degree grid imposed on a side of the inertia wheel, 0 degrees indicating a position similar to a 12 o'clock position on a conventional clock, and when the wheel catch engages one of the plurality of catching members at about 60 degrees, an individual arm cycle is initiated. According to another aspect of the present invention, the catching member maintains engaged with the wheel catch between about 60 and 240 degrees during an individual cycle. Additionally, the wheel catch disengages with the catching member at about 240 degrees. And another aspect of the present invention occurs when the wheel catch disengages the catching member, the transfer follower arm reverses direction by swinging in a translational movement across the leftside and rightside of the inertia wheel. Furthermore, according to another aspect of the present invention, rotational inertia from the weighted orbital drive wheel assists movement of the transfer follower arm between 240 and 60 degrees.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 4 is a side view representation of the of the inertia wheel apparatus, according to an aspect of the present invention;

FIGS. 5A–C are perspective views of a leftside and rightside transfer follower arm, according to an aspect of the present invention;

DETAILED DESCRIPTION OF THE INVENTION

Figure 1:
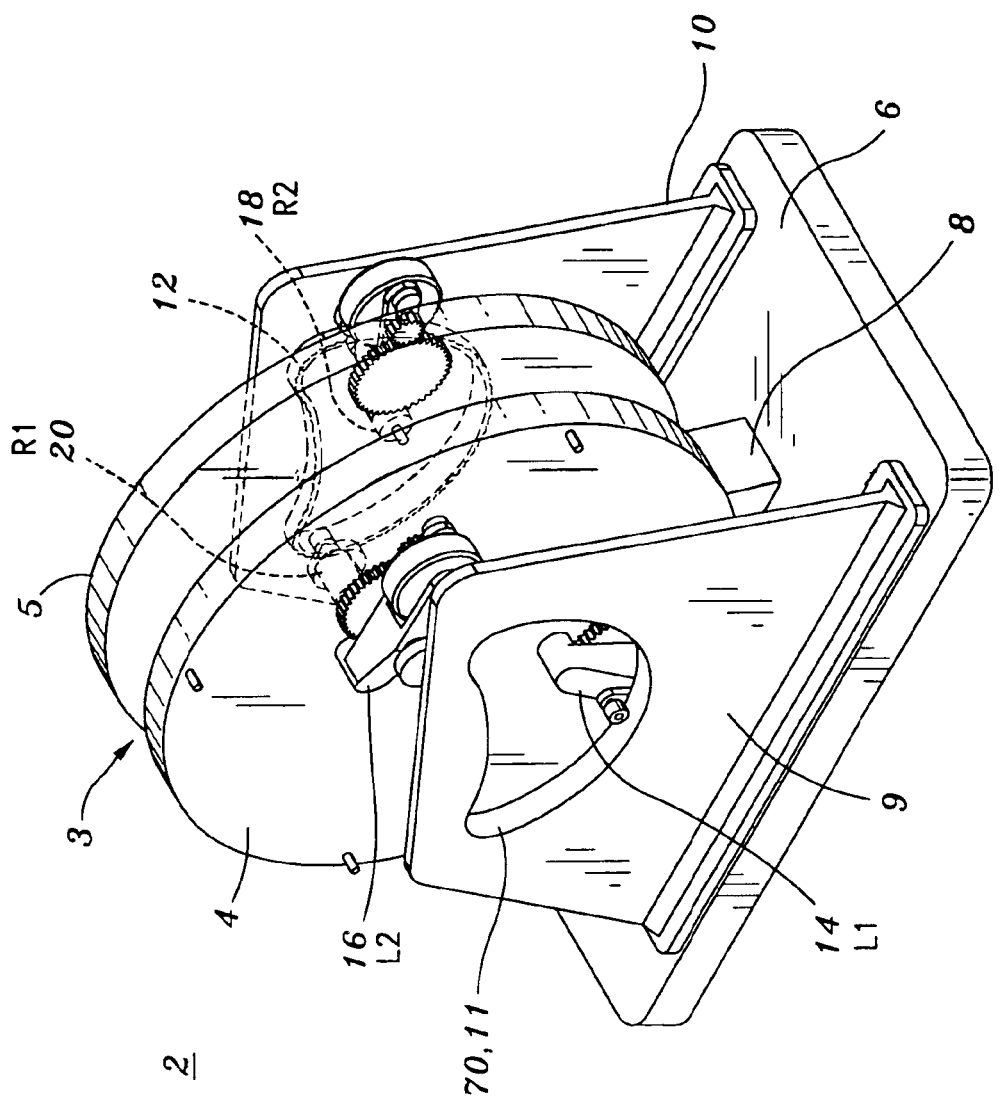
FIG. 1 is a perspective view of an exemplary embodiment of the present invention, including an inertia wheel apparatus and leverage transmission.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of Reciprocating Inertia Wheel Apparatus

FIGS. 1 through 4 depict an exemplary embodiment of an inertia wheel apparatus and leverage transmission 2, according to an aspect of the present invention. The apparatus 2 includes at least an inertia wheel 3 which includes a left weighted wheel 4 and right weighted wheel 5 rigidly connected by a common center axle 7 which rotates about a center axis 13. An upright center axle support 8 provides a bearing journal structure 22 which is adapted to rotatably receive the common center axle 7. In the exemplary embodiment, the center axis 13 is arranged in a horizontal plane. The center axle support 8 is substantially vertically oriented and is rigidly attached to the apparatus base 6.

Attached to the outboard side of the weighted left wheel 4 is a first leftside transfer follower arm assembly 14 and a second left transfer follower arm assembly 16. Both the first and second leftside transfer follower arm assemblies 14, 16 are further attached to and guided by the leftside inverse cam 11. The leftside inverse cam 11 is formed in a leftside cam supporting structure 9. The left side cam forming structure 9 is a vertically oriented planar structure which is rigidly attached to the apparatus base 6. As a result, the leftside cam forming structure 9 is laterally positioned next the left weighted wheel 4 in a parallel manner such that sufficient room is provided for the mechanical movement of the first and second leftside transfer follower arm assemblies 14, 16.

In a similar manner, a first rightside transfer follower arm assembly 18 and a second rightside transfer follower arm assembly 20 are attached to the outboard side of the weighted right wheel 5. The first and second rightside transfer follower arm assemblies 18, 20 are further attached to and guided by the rightside inverse cam 12. The rightside inverse cam 12 is formed in a rightside cam supporting structure 10. The rightside cam forming structure 10 is a vertically oriented planar structure which is rigidly attached to the apparatus base 6. As a result, the rightside cam forming structure 10 is laterally positioned next the rightside weighted wheel 5 in a parallel manner such that sufficient room is provided for the movement of the first and second rightside transfer follower arm assemblies 18, 20.

Base Structure

Figure 2:
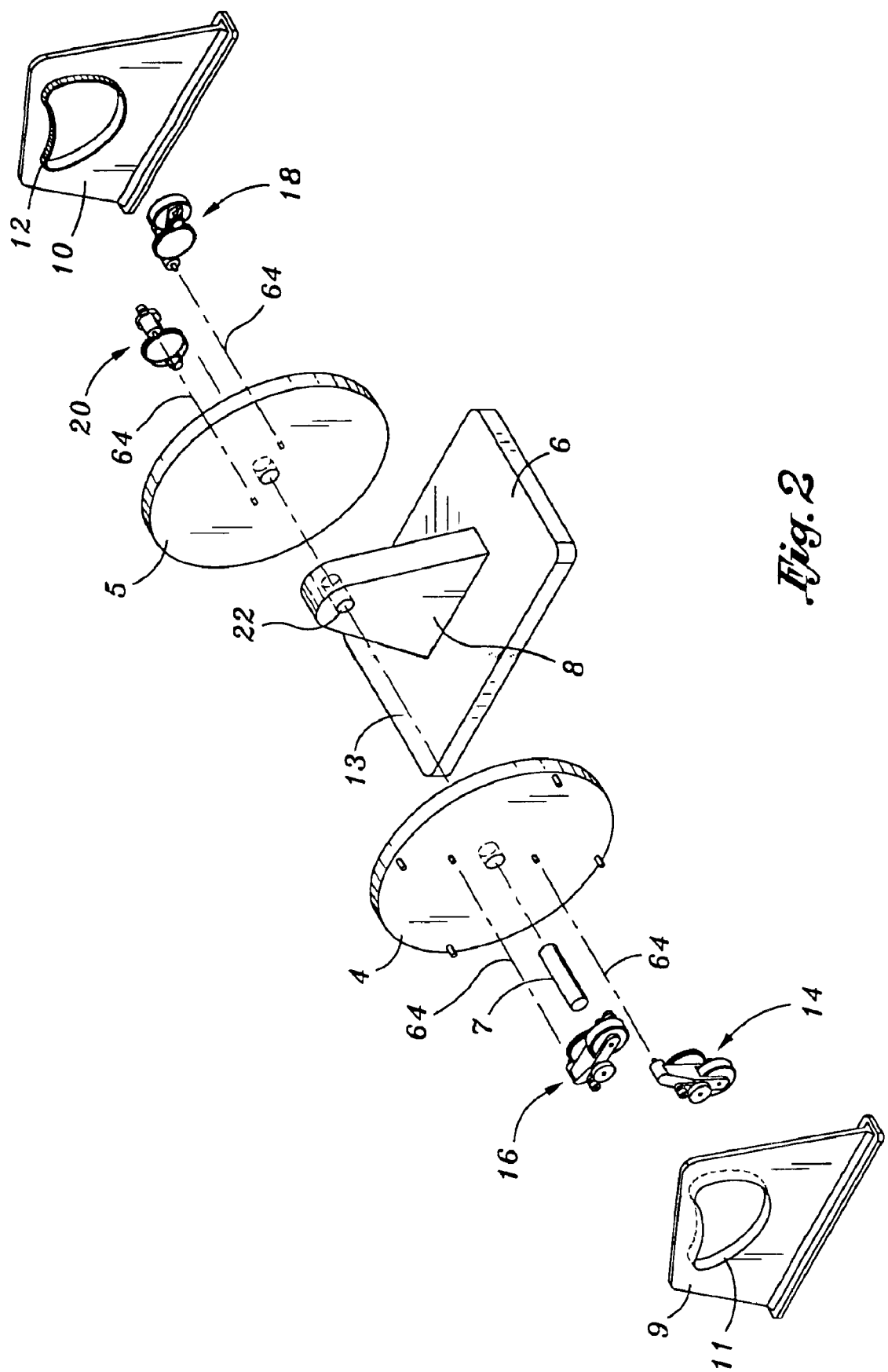
FIG. 2 is an exploded perspective view of the exemplary inertia wheel apparatus and leverage transmission, according to an aspect of the present invention.

FIG. 2 best illustrates the base structure of the present invention which includes a base 6 and a vertically oriented center axle support 8. Base 6 may comprise a variety of embodiments. For instance, the base 6 may be formed from a planar member as depicted in FIGS. 1 through 4. This embodiment may be portable or may be secured to a foundation as a fixture. The base may be made from steel, concrete, or any other material known in the art utilized for machinery foundations. The function of the center axle support 8 is to provide a bearing journal 22 that is adapted to rotatably receive the center axle 7 which is positioned along center axis 13. The center axle 7 and receiving bore 22 may be adapted with a variety of bearings designs/systems known in the art to reduce friction. The specific design of the interface of the center axle 7 and or bearing journal 22 is beyond the scope of the aforementioned invention disclosure. The center axle support 8 is preferably constructed from hardened steel or any other material known in the art that is utilized for high-strength axles. Although the illustrated embodiment depicts the center axle support 8 positioned above the base 6, in another embodiment the center axle support 8 may be attached to an overhead structure.

Inertia Wheel

FIGS. 1 through 4 depict the inertia wheel 3 which includes a leftside weighted wheel 4 and rightside weighted wheel 5 rigidly connected by a common center axle 7 which rotates about a center axis 13. Both the leftside wheel 4 and rightside wheel 5 have an equal diameter. Since both the leftside and rightside wheel 4, 5 are rigidly connected by the center axle 7, they essentially act as one inertia wheel or flywheel 3. This implies that the use of the two weighted wheels 4, 5 rotating in the same direction about center axle 13 provide torque and momentum vectors that combine to act as one flywheel 3 providing a net torque and momentum generated by the pair. The left and right side wheels 4, 5 may be constructed of a variety of materials such as metal, composites, ceramics, plastics, or any other material depending on the desired weight of the inertia wheel.

It is noted that the shape and size of the weighted wheels 4, 5 may vary depending on the application. For instance, one embodiment may utilize a basic disk having a given diameter and thickness. Other embodiments of the weighted wheel may have a weighted rim design which is connected to a hub via spokes. In this embodiment, most of the stored energy is contained in the rim, such that: Moment of Inertia=(Rim Density)(Rim Volume)(Rim Radius)$^2$ Energy=($\frac{1}{2}$)(Moment of inertia)(Spin Speed)$^2$ One aspect of the invention is to provide an apparatus which has flexibility with respect to flywheel specifications. To determine the size and weight of the flywheel, the desired stored energy of the device is determined as follows: Stored Energy=Sum of Kinetic Energy of individual mass elements that comprise the flywheel Kinetic Energy=$\frac{1}{2}*I*w^2$, where I=moment of inertia (ability of an object to resist changes in its rotational velocity); w=rotational velocity (rpm). Moreover, I=$k*M*R^2$ (M=mass; R=radius); k=inertial constant (depending on shape). The inertial constants may vary depending on the exact shape of the flywheel chosen, for instance, for a flywheel weighted or loaded at rim, k=1; for a solid disk of uniform thickness, k=$\frac{1}{2}$; for a solid sphere; for a spherical shell k=$\frac{2}{5}$ spherical shell.

Description of Transfer Follower Arm Assembly

An exemplary embodiment of a transfer follower arm assembly 14, 16, 18, 20 is illustrated in FIGS. 5A–B. The exemplary embodiment of the inertia wheel apparatus 2 includes four transfer follower arm assemblies, including the first and second leftside transfer follower arm assemblies 14, 16 (see FIG. 5A) and the first and second rightside transfer follower arm assemblies 18, 20 (see FIG. 5B). However, alternative embodiments of the present invention may utilize a varying number of transfer follower arm assemblies depending on the application and size of the apparatus 2. For example, alternative embodiments could have 3, 4, 5 or many more transfer follower arms allocated to each side of the apparatus.

The following section describes in detail the subcomponents which make up each transfer follower arm assembly 14, 16, 18, 20. As best shown in FIGS. 5A–B, each transfer follower arm assembly 14, 16, 18, 20 may include an arm structure 24, weighted orbital drive wheel 26, first transmission gear 28, second transmission gear 30, drive gear 32, retaining wheel 34, retaining member 36, first retaining pin 38, second retaining pin 39, first transmission axle 40, and second transmission axle 42. A detailed description of each component and how they are integrated and assembled together as a transfer follower arm assembly follows.

Arm Structure

An exemplary embodiment of the arm structure 24 is shown in FIGS. 3 through 5A–B. Nevertheless, any shape or form of an arm structure 24 is acceptable as long as it performs the same function. The arm structure 24 may be fabricated from any conventional material such as metal, plastic, or composites to maximize structural strength and yet minimize revolving weight. The arm structure 24 is composed of a connecting wrist portion 44, beveled connecting portion 54, main body 56, a pair of planar forks 50, 51, catching member 52, and a transmission gear receiving recess area 58.

In particular, the preferred embodiment of the arm structure 24 provides a cylindrically shaped wrist portion 44 which provides sufficient structure to define a hole or shaft 46 which is adapted to rotatably retain a portion of first retaining pin 38 which is fixed within the outboard side of wheel 4, 5. Each retaining pin 38 defines and is centered about a connecting wrist center axis 64 which is offset from center axis 13 by a distance or radius of R (see FIG. 4). Thus when inertia wheel 3 rotates about center axis 13, the connecting wrist center axis 64 for each transfer follower arm assembly 12, 14, 16, 18 rotates about center axis 13. When the weighted wheels 4, 5 spin, the transfer follower arm assembly 14, 16, 18, 20 will rotate about the first retaining pin 38. A beveled connecting portion 54 of the arm is provided which connects the wrist portion 44 to the main body 56 of the arm. The main body 56 of the arm is located about midway between the entire length of the arm structure 24. The main body 56 provides the structural material to define the second transmission axle receiving hole 48 which is normally and transversely oriented to the outboard side of wheel 4, 5. The pair of planar forks 50, 51 are integrally formed to the main body 56 in an opposed direction to the beveled connecting portion 54 of the arm structure 24. Each fork 50, 51 is formed in a planar shape and oriented in parallel with each other such that the weighted orbital drive wheel 26 may be positioned between each fork 50, 51. A pair of receiving holes 60 are provided in the pair of forks 50, 51 to retain the first transmission axle 40 in a normal and transverse orientation to the planar surfaces of the pair of forks 50, 51. The transmission gear receiving recess area 58 substantially defines the inboard side of the arm 24 such that the first and second transmission gears 28, 30 may be positioned within the recess area 58 so that the transfer follower arm assemblies 14, 16, 18, 20 may rotate about the outboard surface of the wheel 4, 5. Integrally formed to the distal end of the inboard fork 51 is a wheel catch 52 which is adapted to engage a catching member 61 (see FIGS. 2–4) which is rigidly attached to the outer perimeter of the wheel 4, 5.

Weighted Orbital Drive Wheel, Gear Drivetrain, and Cam Track Retaining System

The arm structure 24 provides the structural support for the rotating features of the transfer follower arm assembly 14, 16, 18, 20, which include the orbital drive wheel 26; gear drivetrain components comprising the first transmission gear 28, second transmission gear 30, and a drive gear 32; and a guidance track retaining system which includes at least one retaining wheel 34 and a retaining member 36.

Figure 3:
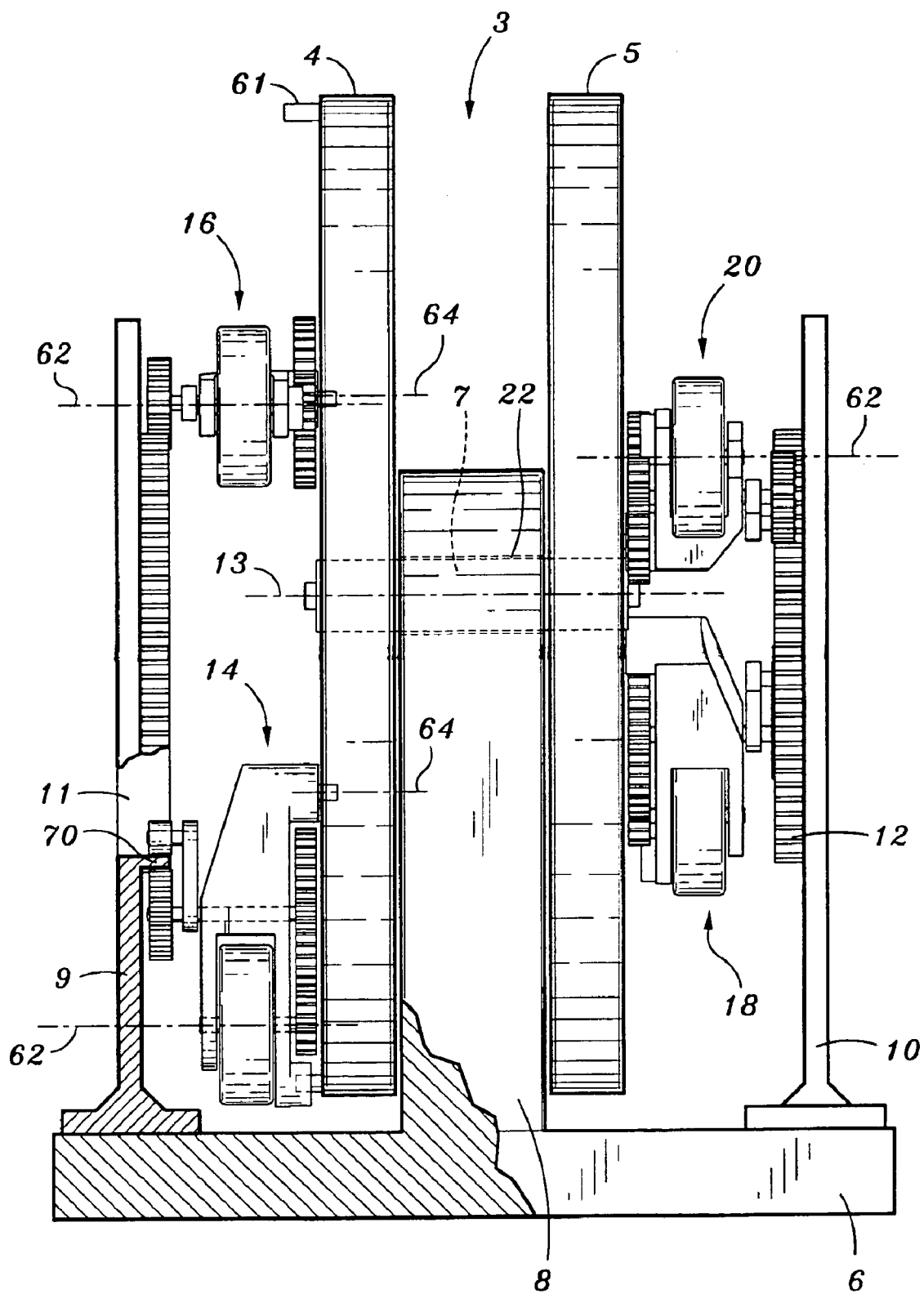
FIG. 3 is a front view of the exemplary inertia wheel apparatus, according to an aspect of the present invention.

As shown in FIGS. 3 and 5A–B, the orbital wheel 26 is positioned between the outboard and inboard forks 50, 51 such that it may spin freely about center axis 62. The orbital drive wheel 26 acts similar to a flywheel in that it is capable of storing energy or dissipating energy. The function and purpose of the orbital drive wheel 26 will be described in greater detail in a later section of the specification. The orbital drive wheel 26 may be made from a material such as metal, plastic or composites in which a variety of weights and densities may be selected for different applications and tuning of the apparatus 2. The exemplary embodiment of the weighted orbital drive wheel 26 has a center receiving hole which fixedly receives the first transmission axle 40. Therefore, when spinning motion is imparted on the weighted orbital drive wheel 26, the wheel 26 and transmission axle 40 spin together as one unit about center axis 62.

Fixedly attached to an inboard offset portion of the first transmission axle 40 is a first transmission gear 28 comprising a spur gear. The first transmission gear 28 is fixedly attached to the first transmission axle 40 similar to that of the weighted orbital drive wheel 26. Thus, the orbital drive wheel 26, first transmission axle 40, and first transmission gear 28 all are centered about and rotate about center axis 62. Furthermore, the weighted orbital drive wheel 26, first transmission axle 40, and first transmission gear 28 act as one unitary device, and therefore, always maintain the same revolutions per minute (RPM).

Intermeshing with the first transmission gear 28 is the second transmission gear 30 which has a substantially greater diameter than the first transmission gear 28. Since the first transmission gear 28 is directly interfaced to the second transmission gear 30, a change in the direction of rotation occurs. For instance, if the first transmission gear is rotating clockwise (cw), the second transmission gear 30 will rotate counterclockwise (ccw) or vice-versa (see FIGS. 4 and 5A). It is further observed in FIG. 3, that both the first and second transmission gears 28, 30 are positioned laterally next to the transmission gear receiving recess area 58 such that the transfer follower arm assembly 14, 16, 18, 20 has sufficient clearance to rotate about the outboard face of wheel 4, 5. The second transmission gear 30 is centered about and rigidly attached to the second transmission axle 42 which is substantially housed and rotatably interfaced within the second transmission axle receiving hole 48. Both second transmission axle 42 and second transmission receiving hole 48 are centered about center axis 60. An outboard portion of the second transmission axle 42 is provided to rotatably receive retaining member 36, and furthermore, the drive gear 32 is then rigidly attached to the distal end of the second transmission axle 42. Thus, when rotational motion is imparted on the second transmission gear 30, the second transmission gear 30, the second transmission axle 42, and the drive gear 32 all rotate in the same rotational direction as a unitary drivetrain member.

Since the retaining member 36 is not rigidly attached to the second transmission axle 42, the retaining member 36 is able to rotate and/or maintain its position relative to the inverse cam 11, 12. As shown in FIGS. 5A–B, the drive gear 32 is positioned and adapted to interface and mesh with system of gear teeth 72 that are disposed on the outer perimeter of the cam track 66, 67. Therefore, to mesh with the gear teeth 72 disposed on the cam track 66, 67, similar gear teeth are disposed on the outer perimeter of the drive gear 32. The drive gear 32 may have teeth directly milled into the circular disk that comprises the gear body. In the alternative, the drive gear 32 may be a circular disk with a resilient gear band stretched about the circular perimeter of the circular disk.

The cam track retaining system includes drive gear 32, the retaining member 36, and at least one retaining wheel 34. As best shown in FIG. 4, the cam track retaining system is adapted to stay movably secured to the cam track 66 while it travels along the track 66, 67. At least one retaining wheel 34 is positioned on the inner perimeter of the cam track 66, 67 while the drive gear 32 is positioned about the outer perimeter of the cam track 66, 67. An alternative embodiment of the cam track retaining system (see FIG. 5C) includes a plurality of retaining wheels 34. In this alternative embodiment, the shape of the retaining member 36 conforms to a general triangular shaped member that provides sufficient area for rotatably securing the plurality of retaining wheels 34.

FIG. 4 shows the rotational movement of retaining member 36 relative to arm structure 24 as it travels about the track 66, 67. In particular, it is observed that the longitudinal position of the retaining member 36 changes with respect to the longitudinal position of arm structure 24. For example, it is observed that the retaining member 36 is longitudinally oriented and in parallel with the arm structure 24 of the first transfer follower arm assembly 12. It is also observed that after the inertia wheel 3 has rotated 180 degrees, the retaining member 36 is no longer longitudinally oriented or in parallel with the arm structure 24, as is depicted in the second leftside transfer follower arm assembly 16.

Cam Supporting Structure and Inverse Cam Track

The inertia wheel apparatus 2 utilizes a pair of cam supporting structures 9, 10 which include leftside inverse cam 11 and rightside inverse cam 12 which communicate motion to the distal end of the transfer follower arm assemblies 14, 16, 18, 20 each of which hold a weighted orbital drive wheel 26. The path in which the orbital drive wheels 21 travel around the outboard sides of wheels 4, 5 is therefore dependent on and a function of the profile of the inverse cams 11, 12.

In particular, FIGS. 1 through 4 show a leftside cam forming structure 9 that is positioned laterally next to and offset from the leftside weighted wheel 4. The leftside cam forming structure 9 is a generally planar structure configured in a substantially vertical and upright position. Similar to the leftside, a rightside cam forming structure 10 is positioned laterally next to and offset from the rightside weighted wheel 5. FIGS. 1 through 3 show the rightside cam forming structure 10, which is also a generally planar structure configured in a substantially vertical and upright position.

The forming structures 9, 10 may be attached to the base 6 in a variety of ways known in the art. Preferably, the forming structure 9, 10 is attached to the base 6 by fastening hardware that may be easily installed and removed such that the transfer follower arm assemblies 14, 16, 18, 20 may be easily accessed for adjustment, maintenance or replacement. Also, since the leftside and rightside inverse cams 11, 12 are integrally formed with the forming structures 9, 10, removal and replacement of the forming structures is required to change cam profiles.

Left and right inverse cams 11, 12 further include left and right inverse cam track 66, 67 of which the cam track retaining system is adapted to be coupled thereto. As seen in FIG. 4, the inverse cam 11 (when viewed from a leftside profile) has a crescent shape in the exemplary embodiment. Depending on the application, the shape or cam profile of the left and right inverse cams 11, 12 may vary. For instance, another exemplary shape or cam profile of the inverse cams 11, 12 may generally resemble a shape of a semi-circle with rounded edges. Even though the cam profile may vary for each specific application according to tuning specifications, the cam profile for the left inverse cam 11 is preferably always similar to that of the right inverse cam 12, except the right inverse cam 12 profile is a mirror image of left inverse cam profile 11.

As is illustrated in FIGS. 1 through 5A–B, the left and right inverse cam tracks 66, 67 are formed from an inwardly protruding rail 70 which functions as a track that follows or conforms to the shape or profile (e.g., crescent or semi-circular) of the inverse cam 11, 12. Integrally formed on the outer perimeter surface of the protruding rails 70 are a plurality of receiving gear teeth or alternating notches 72 which are adapted to receive to the gear teeth disposed on the exterior perimeter of the drive gear 32. The receiving gear teeth 72 are provided such that drive gear 32 has sufficient traction when the weighted orbital drive wheel 26 is driving or "walking" the transverse follower arm 14, 16, 18, 20 during the "disengaged transfer" stage of the "individual cam cycle" which is discussed with greater detail in a following section of the specification.

Functionality of the Inertia Wheel Coupled With a Leverage Transmission

The following section is provided to explain how the inertia wheel apparatus 2 functions. In most general terms, a leverage transmission is coupled to the inertia wheel 3 to control the spinning motion of inertia wheel 3. First, the leverage transmission will be defined. Next, the motion that an individual transfer follower arm assembly 12, 14, 16, 18 experiences during one revolution of the inertia wheel 3, hereinafter referred to as an "individual arm cycle" will be discussed. Finally, the motion that all four transfer follower arms 14, 16, 18, 20 experience relative to each other during the period of a revolution of the inertia wheel 3 is discussed, which is hereinafter referred to as an "integrated cycle."

Leverage Transmission

The leverage transmission includes the left and rightside cam forming structures 9, 10, left and right inverse cams I1, 12 and all four transfer following arms assemblies 14, 16, 18, 20. The leverage transmission is utilized to control the spinning motion of the inertia wheel 3 as a function of the shape or profile of inverse cams 11, 12. By varying the inverse cam 11, 12 profiles, the RPM's, acceleration and deceleration of the inertia wheel 3 can be regulated.

On the leftside of the apparatus 2, the connecting wrists 44 of the first and second leftside transfer follower arms 14, 16 are rotatably attached to the left weighted wheel 4 by first retaining pins 38. As best shown in FIG. 4, a radius R defines the circle perimeter at which the transfer arms 14, 16 are attached. The first leftside transfer arm 14 is attached to the outboard face of the left weighted wheel 4 at position L1 about a first center axis 64. While the second leftside transfer arm 16 is position 180 degrees away from L1 at position L2 about a second center axis 64. On the right side of the apparatus 2, the connecting wrists 44 of the first and second rightside transfer follower arms 18, 20 are rotatably attached to the right weighted wheel 5 by first retaining pins 38. Radius R defines the circle perimeter at which the transfer arms 18, 20 are attached. The first rightside transfer arm 18 is attached to the outboard face of the right weighted wheel at position R1 about a third center axis 64. While the second rightside transfer arm 20 is positioned 180 degrees away from R1 at position R2 about a fourth center axis 64.

It is noted that the connecting wrist positions L1, L2 of the leftside transfer follower arms 14, 16 are 90 degrees out of phase with the connecting wrist positions R1, R2 of the right side transfer follower arms. In other words, all four transfer follower arms 14, 16, 18, 20 are each positioned at 90 degree intervals about the radial perimeter R. As illustrated in FIGS. 1 and 4, and with respect to positioning on radial perimeter R, L1 is positioned ninety degrees from R1 and R2, R1 is positioned ninety degrees from both L1 and L2, L2 is positioned ninety degrees from R2 and R1, and R2 is positioned ninety degrees from L1 and L2.

Individual Arm Cycle

Figure 6:
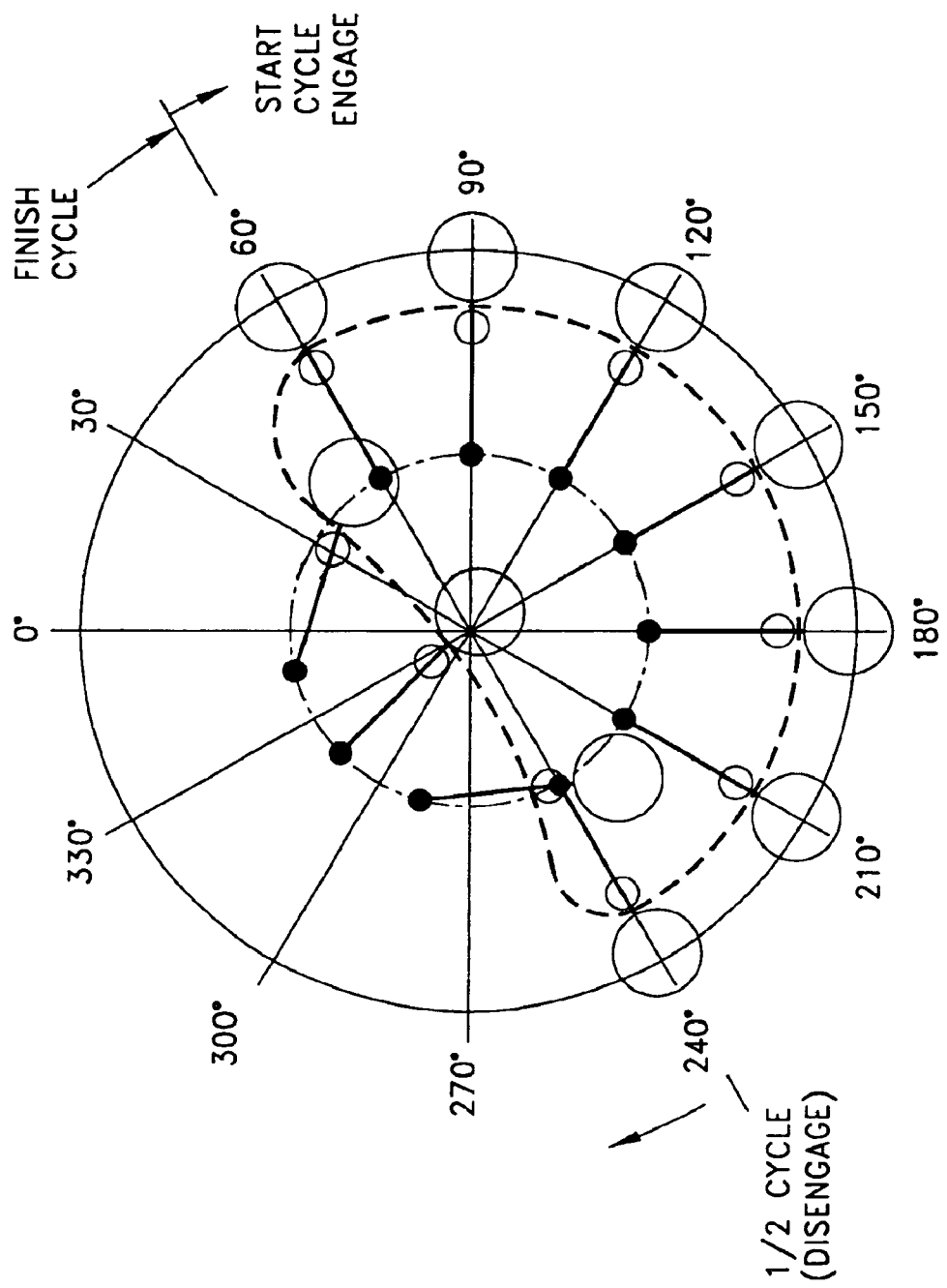
FIG. 6 is a schematic side view representation of the path of a single transfer follower arm and orbital drive wheel during a complete revolution (or "individual arm cycle") of the inertia wheel.
Figure 7A:
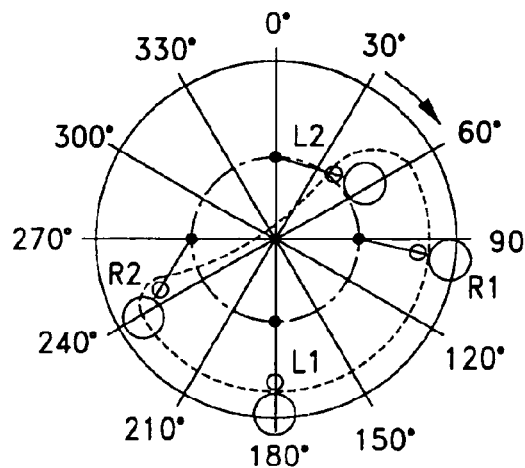
FIGS. 7A–H are schematic representations of the inertia wheel apparatus which illustrates the motion and position of all four transfer follower arms relative to a complete revolution (or "integrated cycle") of the inertia wheel.
Figure 7B:
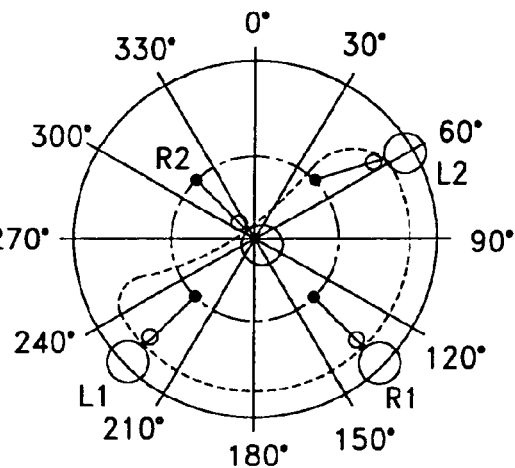
Figure 7C:
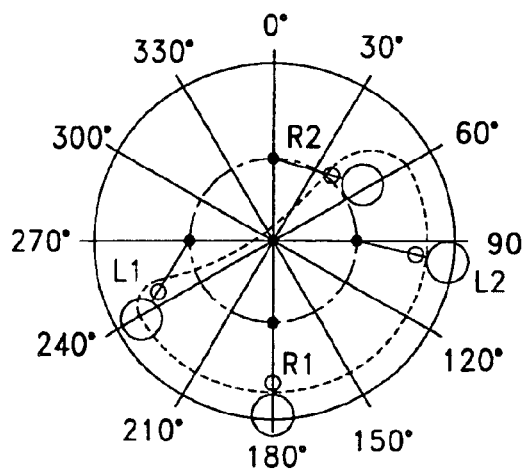
Figure 7D:
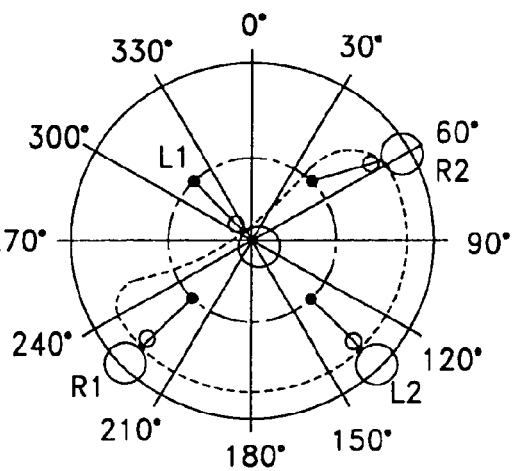
Figure 7E:
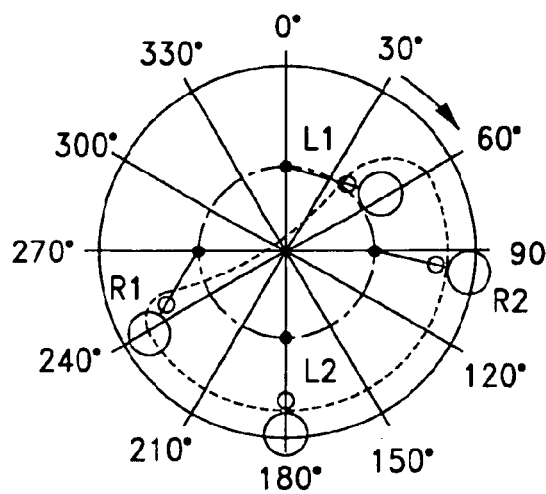
Figure 7F:
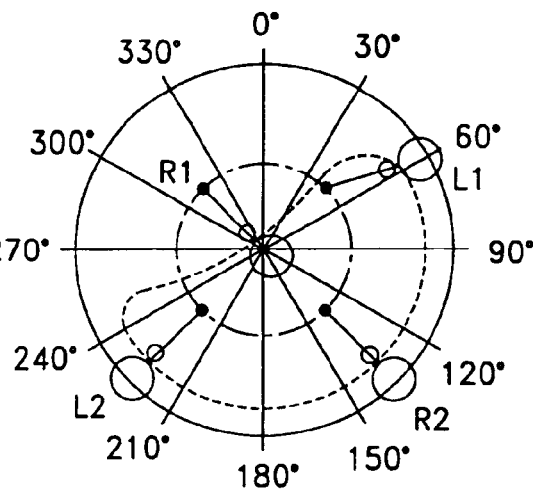
Figure 7G:
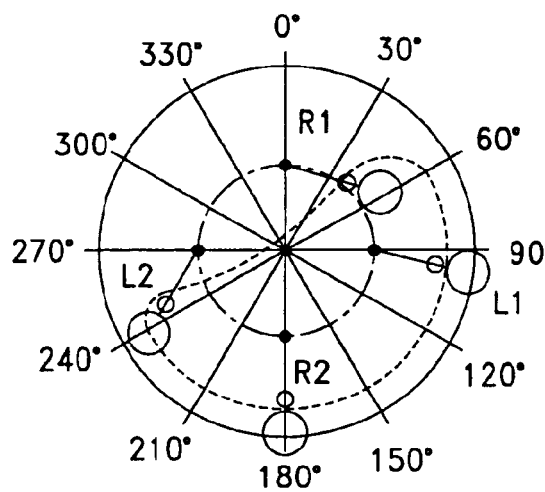
Figure 7H:
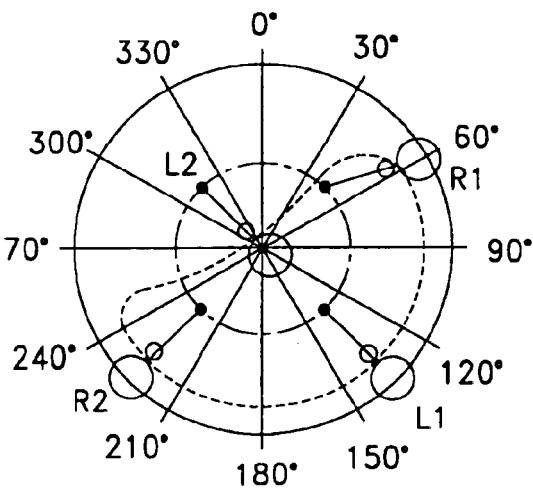

An "individual arm cycle" is best illustrated in FIG. 6 which is a schematic side view representation of the path of a single transfer follower arm assembly 12, 14, 16, 18 during a complete revolution of the inertia wheel 3 where one revolution of the inertia wheel 3 equates to one individual arm cycle. An individual arm cycle can be defined to start at a 60 degrees position and end after a complete revolution (or 360 degrees). The path of the weighted orbital drive wheel 26 follows a similar path to the crescent shape of the inverse cams 11, 12. The individual cycle may be further broken into two stages; a "engaged follower" stage occurring between about 60 to 240 degrees, and a "disengaged transfer" stage or "walking stage" occurring between about 240 to 60 degrees with respect to the revolution of the inertia wheel 3.

The "engaged follower" stage begins at the 60 degrees position where the transfer arm wheel catch 52 engages catching member 61. As depicted in FIGS. 1–4, both the leftside weighted wheel 4 and the rightside wheel 5 each have a plurality of catching members 61 distributed about the perimeter of each respective wheel 4, 5. The exemplary embodiment depicts four catching members 61 positioned on each outboard side of the wheel 4, 5. However, the number of catching members may be substantially increased. For instance, instead of a catching member 61 positioned every 90 degrees, an alternative embodiment may include a catching member positioned every 10 degrees. Thus, in an alternative embodiment, thirty-six catching members 61 may be disposed on each outboard face of wheel 4, 5. It can be appreciated that by increasing the number of catching member 61 distributed around the perimeter of each wheel 4, 5, timing adjustments to the apparatus 2 will be able to be implemented much easier than with a smaller number of catching member 61.

Catching members 61 protrude perpendicularly from the outboard sides of each weighted wheel 4, 5. As shown in FIG. 4, the wheel catch 52, is formed on an extended distal end of the inboard fork 51 of the transfer arm structure 24 and is adapted to engage a catching member 61. When the transfer arm assembly 14, 16, 18, 20 is positioned at 60 degrees, the catching member 61 is timed to be positioned proximately in front of the wheel catch 52. This is the beginning of the "engaged follower" stage of the individual arm cycle. When the wheel catch 52 engages the catching member 61, the weight of the respective transfer arm assembly 14, 16, 18, 20 contributes to the conserved rotational inertia or momentum contained within the inertia wheel 3 while the distal end of the transfer follower arm 14, 16, 18, 20 is simultaneously guided along the profile of inverse cam 11, 12. Between 60 and 240 degrees, the catching member 61 remains in contact with wheel catch 52, thus, defining the "engaged follower" stage.

At 240 degrees the catching member 61 becomes disengaged from the wheel catch 52, and therefore, the "disengaged transfer" stage or "walking" stage is initiated. At this point of the cycle, the transfer arm assembly 14, 16, 18, 20 essentially reverses direction like a pendulum and begins a swinging motion or translational motion upwardly and across the planar outboard surface of the wheel 4, 5. It is particularly noted that during the "disengaged transfer" stage or "walking" stage of the cycle, the weighted orbital drive wheel 26 changes tracking direction and Instead of following the radial circular path defined by the outer perimeter of the weighted wheel 4, 5, the weighted orbital drive wheel 26 begins to track the upper portion of the crescent defined by inverse cams 11, 12. During the "disengaged transfer" stage, the force of the rotational inertia or momentum stored in the orbital drive wheel 26 during the "engaged follower" stage, is transferred to the first transmission gear 28, then to second transmission gear 30, and finally to the drive gear 32 which drives or "walks" the transfer follower arm assembly 12, 14, 16, 18 transversely along the upper portion of the inverse cam 11, 12. About the time when the transfer follower arm assembly 12, 14, 16, 18 reaches the end of the cycle at 60 degrees, the stored rotational inertia is partially dissipated. Therefore, the weighted orbital drive wheel 26 continues to provide the walking force to rotate drive gear to propel the transfer follower arm assembly 12, 14, 16, 18 between the 240 to 60 degrees position of the cycle. This "disengaged transfer" stage ends at 60 degrees when a catching member 61 once again becomes engage d with wheel catch 52. After the respective individual arm cycle (0 to 360 degrees) is completed, a new individual arm cycle is initiated. The individual arm cycle is continuously repeated each revolution of the inertia wheel 3 for each individual transfer follower arm assembly 12, 14, 16, 18.

The Integrated Cycle

An "integrated cycle" encompasses and considers the motion of all four transfer following arms 14, 16, 18, 20 during one revolution of the inertia wheel 3. FIGS. 1, 3, 4 and 7A–H best illustrate "a snapshot" of the motion of each transfer follower arm 14, 16, 18, 20 with respect to each other during an "integrated cycle". As previously discussed, it is initially noted that the connecting wrist positions L1, L2 of the left side transfer follower arms 14, 16 are 90 degrees out of phase with the connecting wrist positions R1, R2 of the right side transfer follower arms 18, 20. In other words, all four transfer follower arms 14, 16, 18, 20 are each positioned at 90 degree intervals about the radial perimeter R. When all four transfer follower arms 12, 14, 16, 18 move simultaneously (as shown in FIGS. 7A–H), momentum or inertial energy of the flywheel 3 may be increased, decreased or governed by a leveraging effect produced from simultaneous forward motion of the four transfer follower arms 12, 14, 16, 18. This leveraging effect results from, inter alia, mechanical timing, offsetting weight transfer, and the gravitational impact on the four transfer follower arm assemblies 12, 14, 16, 18, and in particular, the impact on the weighted orbital drive wheels 26. As the inertial wheel 3 rotates, the sequential and cumulating weight transfer effect of each transfer follower arm 12, 14, 16, 18 may thus be utilized to at least one of regulate, control, govern, condition, increase or decrease the RPM's of the inertial wheel 3.

Although the invention has been described with reference to several exemplary embodiments, it is understood that the words that have been used are words of description and illustration, rather than words of limitation. Furthermore, the present invention may have other uses other than those already previously discussed. For instance, the present invention may be coupled or integrated into a mechanical drivetrain which may include at least one of a variety of system components such as a generator, alternator, air handling systems, gyroscopes, or other devices used in mechanical or electrical systems. Additionally, the present invention may be utilized as a mechanical novelty device. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and such uses are within the scope of the appended claims.

What is claimed is:

1. An apparatus comprising:
   an inertia wheel having a leftside and rightside, said inertia wheel rigidly attached to a center axle, said inertia wheel and center axle adapted to unitarily rotate about a center axis;
   an axle support adapted to rotatably support said center axle such that said inertia wheel and center axle may freely spin about the center axis;
   a generally planar leftside cam supporting structure laterally positioned from said leftside of said inertia wheel such that said leftside cam supporting structure and said inertia wheel are evenly spaced from each other in a parallel manner, said leftside cam supporting structure including a leftside inverse cam;
   a generally planar rightside cam supporting structure laterally positioned from said rightside of said inertia wheel such that said rightside cam supporting structure and said inertia wheel are evenly spaced from each other in a parallel manner, said rightside cam supporting structure including a rightside inverse cam;
   a plurality of transfer follower arm assemblies interconnecting said leftside and rightside of said inertia wheel to said leftside and rightside cam supporting structure;
   wherein rotational movement of said inertia wheel is at least one of conditioned, controlled, regulated, governed and influenced as a function of a profile of said leftside and rightside cam.

2. The apparatus according to claim 1, each one of said plurality of transfer follower arm assemblies comprising:
   a transfer arm structure having a main body with a connecting wrist integrally formed on one end and a pair of forks integrally formed on an opposing end,
      said connecting wrist rotatably attached to an attachment point on one of said leftside and rightside of said inertia wheel, said attachment point defined by a radius R from the center axis;
      said main body having an axle receiving hole transversely oriented within said main body,
      said pair of forks including an outboard fork laterally spaced apart from an inboard fork, said inboard fork further including a wheel catch integrally formed on a distal end of said inboard fork;
   a weighted orbital drive wheel rigidly fit onto a first transmission axle transversely and rotatably mounted to said pair of forks such that said orbital drive wheel may freely spin between said pair of forks;
   a first transmission gear rigidly fit onto a portion of said first transmission axle extending from an exterior side of said inboard fork;
   a second transmission gear rigidly fit onto an inner exterior portion of a second transmission axle rotatably secured within the axle receiving hole transversely oriented within said main body, said second transmission gear positioned such that said second transmission gear intermeshes with said first transmission gear, said second transmission gear having a greater diameter than that of said first transmission gear;
   a drive gear rigidly fit onto an outer exterior portion of said second transmission axle; and
   a cam track retaining system comprising a retaining member having one end rotatably attached to said second transmission axle and further positioned between said drive gear and said transfer arm structure, and at least one retaining wheel rotatably attached to another end of said retaining member.

3. The apparatus according to claim 1, said leftside and rightside inverse cam integrally formed into said respective leftside and rightside cam supporting structure, each supporting structure having a void defined by a crescent shaped perimeter, wherein said plurality of transfer arm assemblies are adapted to be movably attached to said crescent shaped perimeter.

4. The apparatus according to claim 3, said inverse cam further comprising an inwardly protruding rail integrally formed along said crescent shaped perimeter, said rail protruding from an inboard side of said respective leftside and rightside cam supporting structure and oriented perpendicular to said respective leftside and rightside cam supporting structure.

5. The apparatus according to claim 4, said inwardly protruding rail having an inner side adapted to interface to at least one retaining wheel and an outer side having gear teeth disposed on the surface thereof, said gear teeth adapted to intermesh with a drive gear of one of said plurality of transfer arm assemblies.

6. The apparatus according to claim 1, wherein each of said plurality of transfer follower arm assemblies comprises a connecting wrist rotatably attached to a side of said inertia wheel and a cam track retaining system adapted to movably couple said transfer follower arm assembly to said respective leftside or rightside inverse cam.

7. The apparatus according to claim 2, wherein each connecting wrist is attached to said side of said inertia wheel along a radial perimeter having a radius R from the center axis of said apparatus.

8. The apparatus according to claim 7, said plurality of transfer follower arm assemblies comprising,
   a first and second leftside transfer follower arm assembly positioned between a leftside of said inertia wheel and said leftside cam supporting structure; and
   a first and second rightside transfer follower arm assembly positioned between a rightside of said inertia wheel and said rightside cam supporting structure;
   said connecting wrist of said first leftside transfer follower arm assembly attached to a rotational attach point L1 positioned on said leftside of said inertia wheel about the radial perimeter defined by R;
   said connecting wrist of said second leftside transfer follower arm assembly attached to a rotational attach point L2 positioned on said leftside of said inertia wheel about the radial perimeter defined by R, and positioned 180 degrees from said attach point L1;
   said connecting wrist of said first rightside transfer follower arm assembly attached to a rotational attach point R1 positioned on said rightside of said inertia wheel about the radial perimeter defined by R;
   said connecting wrist of said second rightside transfer follower arm assembly attached to a rotational attach point R2 positioned on said rightside of said inertia wheel about the radial perimeter defined by R, and positioned 180 degrees from said attach point R1;
   wherein R1 is further positioned about the radial perimeter such that R1 is spaced 90 degrees from both L1 and L2, and positioned there between L1 and L2 along the radial perimeter; and
   wherein R2 is further positioned about the radial perimeter such that R2 is spaced 90 degrees from both L1 and L2, and positioned there between L1 and L2 along the radial perimeter.

9. The apparatus according to claim 2, said inertia wheel further comprising a plurality of catching members positioned proximate a outer perimeter of said leftside and rightside of said inertia wheel, said plurality of catching members protruding from said leftside and rightside of said inertia wheel in a perpendicular orientation.

10. The apparatus according to claim 9, wherein said wheel catch of said transfer arm structure is adapted to engage one of said plurality of catching members.

11. The apparatus according to claim 10, wherein when said inertia wheel rotates about the center axis, said cam track retaining system on each of said plurality of transfer follower arm assemblies travels around a perimeter of said inverse cam.

12. The apparatus according to claim 11, wherein when said wheel catch of said transfer arm engages one of said plurality of catching members, an individual arm cycle is initiated.

13. The apparatus according to claim 12, wherein a transfer follower arm circumvents the perimeter of said inverse cam in one cycle.

14. The apparatus according to claim 13, wherein an individual arm cycle correlates to one revolution of said inertia wheel.

15. The apparatus according to claim 14, wherein the motion of each of said transfer follower arms is measured according to a 360 degree grid imposed on a side of said inertia wheel, 0 degrees indicating a position similar to a 12 o'clock position on a conventional clock, and wherein said wheel catch engages one of said plurality of catching members at about 60 degrees, therefore initiating an individual arm cycle.

16. The apparatus according to claim 15, wherein said catching member maintains engaged with said wheel catch between about 60 and 240 degrees during an individual cycle.

17. The apparatus according to claim 15, wherein said wheel catch disengages with said catching member at about 240 degrees.

18. The apparatus according to claim 16 wherein when said wheel catch disengages said catching member, said transfer follower arm reverses direction by swinging in an upwardly translational movement across said leftside or rightside of said inertia wheel.

19. The apparatus according to claim 17, wherein rotational inertia from said orbital drive wheel assists movement of said transfer follower arm between 240 and 60 degrees.

* * * * *